United States Patent [19]
Gerrissen et al.

[11] Patent Number: 5,319,747
[45] Date of Patent: Jun. 7, 1994

[54] DATA PROCESSING SYSTEM USING GESTURE-BASED INPUT DATA

[75] Inventors: Jacques F. Gerrissen; Jozeph P. M. Van Itegem; Johannes R. H. Daamen; Jaap J. De Boer, all of Eindhoven, Netherlands

[73] Assignee: U.S. Philips Corporation, New York, N.Y.

[21] Appl. No.: 62,491

[22] Filed: May 14, 1993

Related U.S. Application Data

[63] Continuation of Ser. No. 616,447, Nov. 20, 1990, abandoned.

[30] Foreign Application Priority Data

Apr. 2, 1990 [EP] European Pat. Off. ........ 90200780.6

[51] Int. Cl.⁵ .............................................. G06F 3/00
[52] U.S. Cl. .................................... 395/155; 395/153; 395/159; 395/119; 395/152; 345/163

[58] Field of Search ............... 395/155, 159, 119, 152, 395/153; 340/710, 825.19; 434/112, 257; 345/163

[56] References Cited

U.S. PATENT DOCUMENTS

| | | | |
|---|---|---|---|
| 4,414,537 | 11/1983 | Grimes | 434/112 X |
| 4,878,843 | 11/1989 | Kuch | 434/112 |
| 4,974,173 | 11/1990 | Stefik et al. | 395/159 X |
| 5,008,853 | 4/1991 | Bly et al. | 395/159 X |
| 5,047,952 | 9/1991 | Kramer et al. | 434/229 X |

*Primary Examiner*—Raymond J. Bayerl
*Attorney, Agent, or Firm*—Leroy Eason

[57] ABSTRACT

A data processing system having a hand-gesture based display, user communication through the system and interaction with the system being effected by inputting of data signified by a hand code which includes representations of commonly understood natural hand gestures. This enables such communication and interaction to be achieved with compact data formats, represented by displayed hand postures, thereby achieving reduced bandwidth and increased data input speed.

6 Claims, 2 Drawing Sheets

DATA PROCESSING SYSTEM USING GESTURE-BASED INPUT DATA

This is a continuation of application Ser. No. 07/616,447, filed Nov. 20, 1990, now abandoned.

BACKGROUND OF THE INVENTION

1. Field of the Invention

The invention relates to a data processing system comprising a display for visualizing the processing operations carried out by the system.

2. Description of the Related Art

Such systems are widely known and used, the system's display functioning as an interface with the user. The display may play the part, for instance, of a feedback means for visualizing the system's operating state, whereupon the user may take some action in order to control the system's operation on the basis of the information displayed. Likewise, the display may function as a link in a communication channel between two or more users communicating through the system.

Interaction with and communication via the system by means of a display involves the exchange of information between the system and the user in a format that should be adapted to the user's perception, and that in addition should be transformable into a format that enables efficient processing by the system.

Various ways are known for representing and visualizing information on a display for accomplishing a dialogue with or through the system. An example thereof is the displaying of text, generated as a result of the system's operation and to be read by the user, and the inputting of text (e.g. instructions) into the system via a keyboard or by selecting a displayed field with a text, data associated therewith being input by guiding a cursor towards that field by manipulating a mouse and clicking an appropriate button.

Another example is the manipulation of a joy-stick or another control device, movements thereof or forces exerted thereon being translated into associated actions of a displayed cursor or another object.

Still another example relates to the inputting of data via a digitizing tablet or touch screen coupled with the display, for instance for inputting handwritten text or handdrawn figures, the display functioning partly as a visual feedback means.

For various applications the communication via and interaction with the system could be improved by adapting the way in which the data is manifested on the display.

SUMMARY OF THE INVENTION

An object of the invention is to provide a data processing system comprising a display for visualizing the data processing, that uses an appropriate code (or language) for representing the displayed information to be perceived by the user, and which reduces the bandwidth of the signal transfer representing the dialogue with or via the system, thereby leading towards a faster and less tiresome interaction between the user and the system and communication via the system.

To this end, a data processing system according to the invention is characterized in that the system further comprises
figure-forming means for generating on the display an image of a schematized human hand; and
control means coupled with the figure-forming means for controlling the posture of the hand image or a sequence of postures of hand images to provide communication via the system or interaction with the system by means of a hand posture language which includes at least two different hand forms postures.

The communication and interaction by means of a hand posture code for expressing information or additional information has particular advantages for in a visual way enriching audio communication by natural gestures of the hand image or for visualizing the intended manipulation with or the attribution of a particular meaning to a displayed object by an associated posture of the hand image. Moreover, a language based on natural gestures is easy to learn. In addition, a gesture language may provide a low bandwidth communication tool when performing operations on displayed figures in both the interactive mode or in the communication mode. For instance, a schematized hand image with a pointing index finger may be used for indicating a displayed data field or a displayed object, e.g. for selection of or for focussing attention on a particular field or object. Other examples of imitated gestures may indicate the artificial equivalent of:
switching a schematized pointing hand between displayed data items for indicating a relationship there-between;
the intention of removing a particular shown object, by waving the schematized hand nearby or over the object;
indicating a desired change of the size of a particular object by showing a schematized hand, the index finger and thumb of which approach each other or move away from each other when asking for a reduction or magnification, respectively;
indicating the intended relocation of an object by grasping with the schematized hand the imaginary object and displacing it over a short distance.

It should be noted that in addition to separate and stationary schematized hand images for representing respective signs, sequences of schematized hand images in particular are suited to the expression of compound signs. For instance, a particular operation to be executed on a particular object may be indicated by a selection sign succeeded by a sign or a sequence of signs corresponding to the particular operations.

As the meaning of such gestures is readily perceived and the information is presented in a condensed format, interaction with and communication via the system proceeds rapidly and in a natural way, even when the gesture-vocabulary is restricted to only a few, for example 6, different signs, taking into account various combinations of the gestures for generating compound signs.

A restricted vocabulary has the advantages that a user may readily adapt to this kind of data communication and retain the acquired skill once learned. Moreover, the bandwidth of the system's communication channels and the system's memory capacity for storage of the vocabulary, as far as they are related to the hand posture code, may be kept limited, thereby saving cost and gaining speed.

It should be noted that both the communication through the system and interaction with the system may occur alternately using the same hand posture language. In other words, the hand posture signs as interpreted by the user correspond with the operations executed by the system upon being activated by hand posture sign commands.

The invention may find its application in for instance computer supported collaborative work, wherein several users share a virtual common workspace accessible to and visible for each of them through separate terminals for collectively performing a task. Into this virtual workspace information items may be introduced which are to be visualized and that may be rearranged, rescaled and replaced upon applying the appropriate hand image posture signs. Moreover, before the execution of the various operations on the displayed information items is started, the hand image signs representing the intended operation function as a means for preparing the participators for the next execution stage. Thus, collective designing or collective schematizing is accomplished in a clear and natural way. Preferably, the schematized hand images as controlled by a particular participator in this collaborative work are personified for instance on the basis of colour, size or form of the hand image. This attribution enables each participator to be identified in the virtual work space in a simple way.

Another application is the interaction between a user and a computer-aided design (CAD)-system. Scaling-, removing- and relocating-commands, for instance, can be introduced into the system in an ergonomic way by pressing an appropriate key associated with the relevant hand posture sign after having indicated the items to be operated on. Switching between the visualized workspace and a menu for selecting particular operations, as in conventional systems, thus is avoided.

Preferably, a cursor is presented as a schematized hand image, the posture of which is controllable in dependence on the desired sign to be expressed. It should be mentioned that, although the invention allows the use of a schematized hand image as a cursor, the availability of a plurality of hand images broadly extends the application towards multi-sign communication.

In an embodiment of a data processing system according to the invention the control means includes:
a memory for storing a plurality of posture codes of the image; and
image posture code selection means coupled with the memory for selecting a particular stored posture or a particular sequence of stored postures to be displayed.

The communication or interaction may be based on both stationary hand signs or moving hand signs. In the latter case manipulating the selection means addresses a particular sequence of stored hand images which upon being displayed give the impression of motion.

In a further embodiment of a data processing system according to the invention is the selection means comprises at least one of the following devices:
a keyboard including a key to be controlled by a user so that activating said key selects a particular posture to be displayed;
a multi-button mouse device for selecting a particular posture or sequence of postures by activating a particular button. Preferably the keys or buttons are disposed with respect to each other in such a manner that actually manipulating said keys or buttons at least in some degree requires the user's hand to assume a posture that corresponds with the displayed hand image postures selected by said keys, thereby giving access to the system in an ergonomically justified way. Preferably, the selection means should be manifactured in both a right-handed version and a left-handed version.

Preferably, cultural differences as regards the hand posture language should be taken into account (see for instance, Desmond Morris: "Manwatching", 1977). Therefore, several vocabularies may be stored in the system's memory.

The hand posture code need not be restricted to signs related to a particular position or motion of a single hand. For instance, the sign to put objects more close to each other may be expressed by a pair of stretched hands that approach each other while being kept more or less parallel.

BRIEF DESCRIPTION OF THE DRAWINGS

The invention will be explained hereinafter by way of example and with reference to the accompanying diagrammatic drawings in which.

DESCRIPTION OF THE PREFERRED EMBODIMENTS

Figure 1:
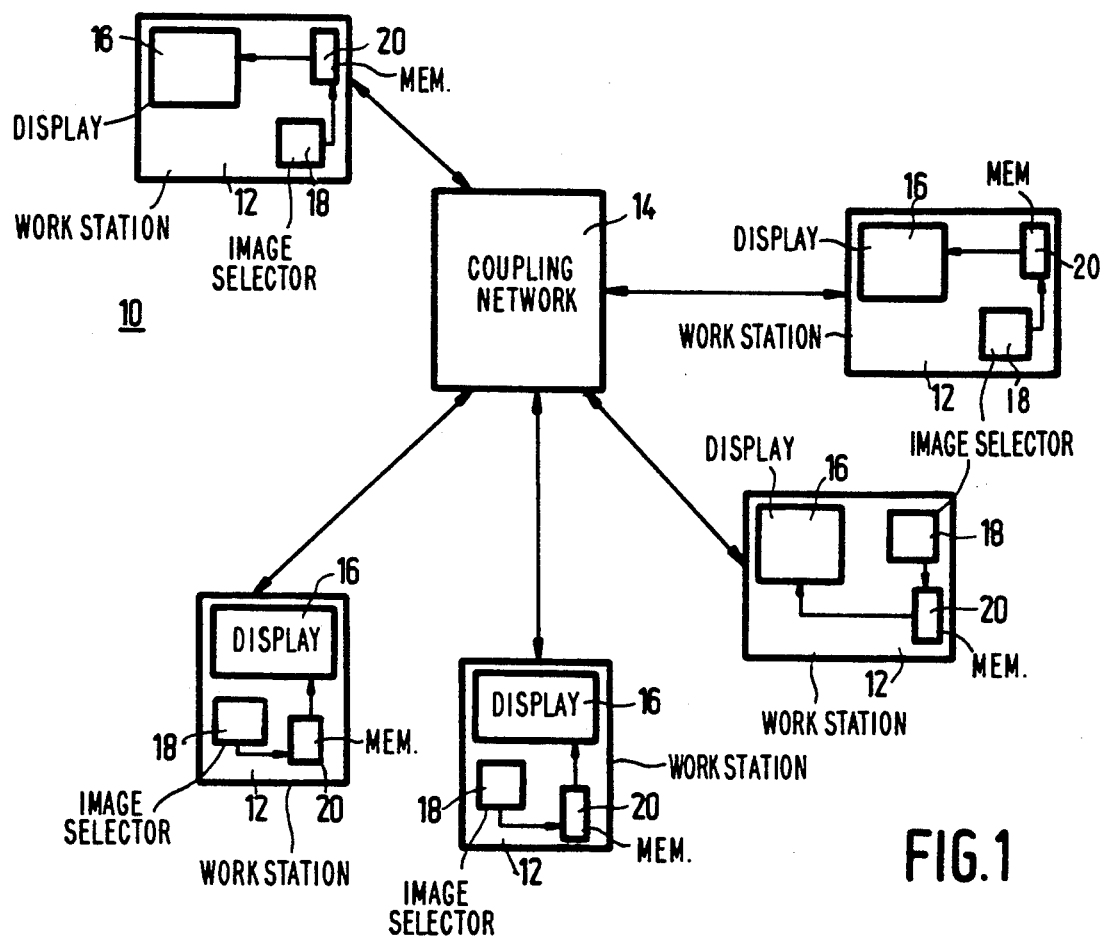
FIG. 1 shows an example of a data processing system according to the invention, for use in computer supported collaborative work.

FIG. 1 schematically shows an example of a data processing system according to the invention that is used for multi-user communication through the system. The data processing system 10 comprises a plurality of user work stations 12, that are inter-coupled via a coupling network 14. Through each station 12 a virtual workspace, common to all stations 12, is accessible and data can be introduced from each station 12 into this virtual workspace. The virtual workspace is visualized via a display 16 in each station 12. Operations on the displayed data are to be proposed or performed by means of a hand posture code. To this end, each station 12 includes, in addition to a conventional data input device (not shown) such as for instance an alphanumeric keyboard or a digitizing tablet, image posture code selector means 18 for selecting a particular hand posture image out of a plurality of hand posture image codes that are stored in memory 20. This particular hand posture image code expresses particular information to be introduced into the common virtual workspace for being visualized. For instance, for the collective solving of ordening, designing or schematizing problems on information items such as keywords or symbols, these items may be introduced conventionally into the virtual workspace, whereupon the desired operations on these items may be visualized by particular hand posture image codes introduced in the same virtual workspace, visible to all users. Moreover the desired operations may be executed through the same hand posture image codes that thus are meaningful to both the users and the system. For instance, after having introduced a particular hand posture sign or compound sign into a particular area as being visually associated with a displayed information item, and agreement is reached on the execution of the particular operation represented by the hand posture sign or compound sign, the execution is started, for instance by clicking an activate-button or -key. It should be noticed that the users need not be present in the same real workspace such as a meeting room or a conference hall. In fact they may be spread over different rooms, buildings or even countries.

Figure 2:
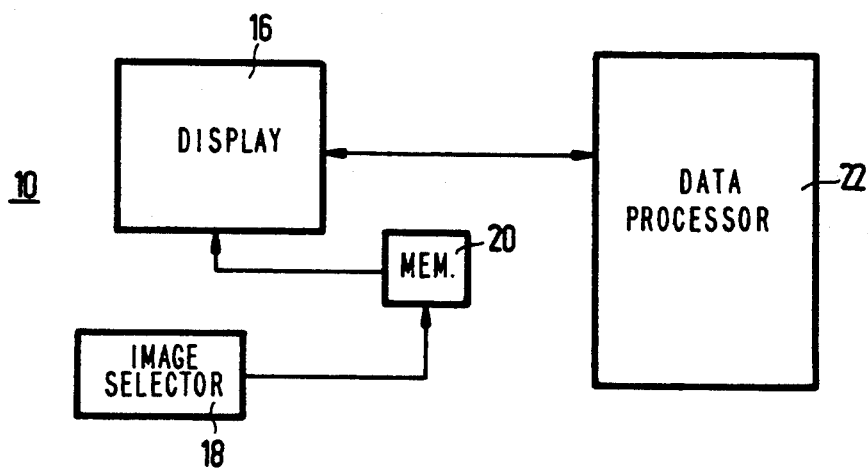
FIG. 2 shows another example of a data processing system according to the invention, suitable for interaction between a user and the system.

In FIG. 2 is shown an example of a data processing system according to the invention to be used for interaction between the user and the system. The data processing system 10 now comprises a display 16 as a feedback means towards the user, and, in addition to the above-mentioned conventional data input devices (not shown), image posture code selector means for selecting predetermined operations based on a hand posture code, stored in memory 20. Upon inputting a selected hand posture sign into the system 10 an operation associated therewith is performed by a data processing device 22 on data shown on the display 16. For instance, a designing task may be performed using hand posture code operations such as: reduce the dimensions of a selected image representing an object, magnify the image, increase the horizontal distance between two selected objects, delete a particular feature. This could be accomplished for example by first inputting a hand pointing operation, indicating a displayed entity on which a next operation is to be performed, whereupon the intended operation is selected in conformity with the hand posture code available.

In FIGS. 3A-3H schematic examples of schematized hand posture image codes representing operations are outlined.

Figure 3A:
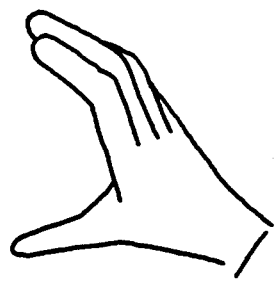
FIGS. 3A-3H show some examples of schematized hand posture signs for use in a data processing system according to the invention.
Figure 3B:
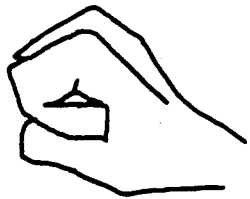

In FIG. 3A a sign is depicted that may be used for expressing the operation <open file>, whereas its counterpart <close file> is shown in FIG. 3B. The same pair of signs could be used for taking hold of a particular shown object (FIG. 3B) for transport across the displayed field until it is let loose (FIG. 3A), thereby accomplishing a displacement.

Figure 3C:
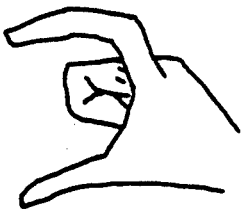
Figure 3D:
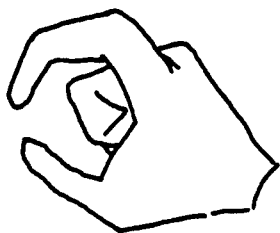
Figure 3E:
Figure 3F:

The signs of FIGS. 3C and 3D may be used for the operations <increase a selected (or all) linear dimension(s)> and <decrease a selected (or all) linear dimension(s)>, respectively. FIG. 3E shows the sign for indicating a particular item displayed and may be used for selection after such indication. FIG. 3F represents the sign that may be used for deleting or removing a particular displayed feature by disposing or waving it over that particular feature. Another application thereof may be the indication of interrupting a sequence of operation steps, giving the impression of a <stop>-sign. The sign according to FIG. 3G may be used for indicating an intended change of distance between two displayed objects along a predetermined dimension. The sign of FIG. 3H can be used for indicating a window for drawing attention to what is shown in the window, for instance, in order to set bounds to the number of objects to be operated upon.

In this way, depending on the context, hand image postures and sequences thereof may be used as an artificial equivalent of a natural gesture language for expressing in a compact format information to be understood by the users or to be processed by the system.

The hand posture signs may be displayed as being stationary or as giving the impression of motions as in actual gesture language. For instance, the sign indicated by FIG. 3C may be shown as having the index and thumb locations switching between respective positions wherein the tips of the index and the thumb are spaced well apart. Alternatively, the colour of grey-tone may switch periodically.

Figure 3G:
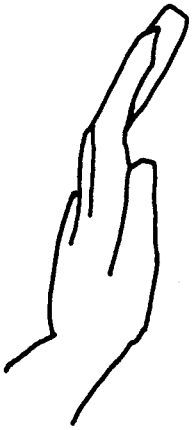
Figure 3H:

With respect to the postures of FIG. 3C, 3D and 3G the linear dimension relating to the respective operations indicated may be chosen by providing the selection means with keys or buttons each selecting one of several orientations possible, or with a knob for rotating the image of the displayed hand image posture, thereby selecting the particular dimension.

As has been mentioned hereinabove, hand images may be combined for expressing compound meanings. For instance, selection or indication of a particular shown object (FIG. 3E) and thereupon waving a flat hand (FIG. 3F) over or nearby the object expresses the intention of removing the object or, when activated, removes the object. Another compound meaning is for instance the use of the window-sign of FIG. 3H for, focussing attention on a limited part of the virtual work space, for example a group of objects, followed by the sign of FIG. 3G, wherein the flat hands are brought closer together, indicating the operation of making the group more compact or of a uniform reduction of size.

Figure 4:
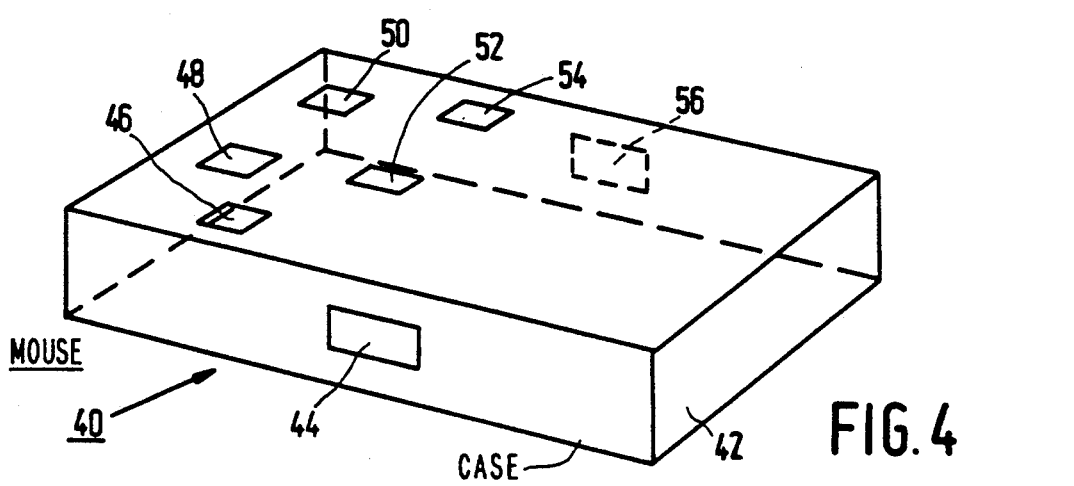
FIG. 4 shows an example of a multi-button mouse for use in a data processing system according to the invention.

FIG. 4 is a schematic diagram of a multi-button mouse device for use with a data processing system according to the invention. The mouse 40 includes a case 42 the form of which is adapted to the hand of the user. The position of the buttons 44, 46, 48, 50, 54 and 56 is chosen such as to offer an ergonomically justified manipulation of the mouse 40. The location of button 46 gives rise to, in some degree, a closed hand, corresponding to a sign as the one of FIG. 3B. The location of button 48 can be used for pointing or selecting an indicated item on the display, thereby positioning the user's hand according to the position of the hand image of FIG. 3E. The buttons 50 and 52 force the user's hand to adopt postures, that reflect those of FIG. 3C and 3D, respectively, and therefore are suitable for activating operations that may be associated with these postures. Button 54 may be used in the same ergonomic manner to activate an <open file>-command or a <let loose the indicated object>-command as figures by the sign of FIG. 3A. Button 56 drawn by way of a dotted line may be used for selecting the <interrupt>-operation of the <delete>-command.

We claim:

1. A data processing system which establishes a common virtual workplace for a plurality of individual workstations at respective locations, said system comprising said plurality of workstations, each workstation comprising:

display means for producing an image field signifying to a user of said workstation data processing operations being performed on information items in said image field; and control means by which the user can select particular data processing operations to be performed on information items in said image field, said control means controlling said display means to produce in said image field one or more images of a human hand at positions and in a posture or sequence of postures selected from a hand position code such that the displayed hand images represent the selected particular data processing operations;

said system further comprising coupling matrix means for interconnecting the individual workstations so that the same information items are produced in the displayed image fields of all workstations, and the hand images produced in the image field of a workstation by a user of such workstation are also produced in the image fields of all of the workstations.

2. A data processing system as claimed in claim 1, wherein the control means includes an identification means for assigning to the displayed image of the human hand an identifier representing the identity of a particular user of the control means.

3. A data processing system as claimed in claim 2, wherein the identification means assigns at least one of the following identifiers to the image:
   a particular color selected out of a plurality of colors;
   a particular size selected out of a plurality of sizes for the hand image;
   a particular form selected out of a plurality of forms.

4. A data processing system as claimed in claim 1, wherein said control means comprises:
   a memory for storing a plurality of hand posture images; and
   selection means coupled to said memory for selecting from the stored hand posture images a particular image or sequence of images in accordance with instructions signified to said selection means by the user.

5. A data processing system as claimed in claim 4, wherein said selection means comprises at least one of:
   (i) a keyboard including one or more keys to be actuated by the user to select a particular hand posture image or sequence of images from those stored in said memory; and
   (ii) a mouse device including one or more buttons to be actuated by the user to select a particular hand posture image or sequence of images from those stored in said memory.

6. A data processing system comprising:
   a display for producing a visual image field signifying to a user of the system one more or data processing operations being performed by the system on information items in said image field; and
   control means for controlling said system to perform data processing operations selected in accordance with instructions signified to said control means by a user, and for causing said display to produce in said image field one or more images of a human hand at positions and in a posture or sequence of postures selected from a hand position code which relates particular positions, postures and sequences of postures of said hand images to corresponding data processing operations to be performed on information items in said image field other than said hand images;
   said hand posture code including at least two different hand posture images;
   the hand images in said image field constituting a visual indication of the data processing operations corresponding thereto to be performed in accordance with the user's instructions on information items in said image field other than said hand images;
   said control means comprising a memory for storing a plurality of hand posture images and selection means coupled to said memory for selecting from the stored images a particular image or sequences of images in accordance with instructions signified by the user;
   said selection means comprising a mouse device having one or more buttons positioned so that in order to actuate any particular button or buttons the user's hand must assume a distinctive posture, the posture so assumed corresponding to a similar posture of a hand image produced in said display by the actuation of said particular button or buttons, said posture corresponding to a sign in a hand posture language signifying a particular data processing operation to be performed by said system on information items in said image field other than said hand image.

* * * * *